(12) United States Patent
Lee et al.

(10) Patent No.: US 8,515,464 B2
(45) Date of Patent: Aug. 20, 2013

(54) APPARATUS AND METHOD FOR PAGING IN WIRELESS COMMUNICATION SYSTEM

(75) Inventors: Namsuk Lee, Daejeon (KR); Sook Jin Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 49 days.

(21) Appl. No.: 13/248,222

(22) Filed: Sep. 29, 2011

(65) Prior Publication Data

US 2012/0157145 A1    Jun. 21, 2012

(30) Foreign Application Priority Data

Dec. 21, 2010    (KR) .................. 10-2010-0131852

(51) Int. Cl.
*H04W 68/00*    (2009.01)
(52) U.S. Cl.
USPC ..... 455/458; 455/515; 455/343.1; 455/343.2; 370/311; 340/7.1; 340/7.2; 340/426.21
(58) Field of Classification Search
USPC ............. 455/343.1–343.6, 458, 117, 127.1, 455/230, 298, 572, 574, 127.5, 515; 370/311; 340/426.21, 7.1, 7.2, 7.21–7.23, 7.28–7.31
See application file for complete search history.

(56) References Cited

U.S. PATENT DOCUMENTS

| | | | |
|---|---|---|---|
| 6,832,094 B2 * | 12/2004 | Butler et al. | 455/458 |
| 6,999,753 B2 * | 2/2006 | Beckmann et al. | 455/458 |
| 7,978,638 B2 * | 7/2011 | Kim et al. | 370/311 |
| 8,213,965 B2 * | 7/2012 | Park et al. | 455/458 |
| 2004/0147271 A1 * | 7/2004 | Billon et al. | 455/458 |
| 2006/0089161 A1 * | 4/2006 | Kim et al. | 455/458 |
| 2006/0094450 A1 * | 5/2006 | Park et al. | 455/458 |
| 2008/0095088 A1 * | 4/2008 | Ryu et al. | 370/311 |
| 2009/0156236 A1 * | 6/2009 | Jung et al. | 455/458 |
| 2009/0303953 A1 | 12/2009 | Kang et al. | |
| 2010/0167756 A1 | 7/2010 | Park et al. | |
| 2011/0065461 A1 * | 3/2011 | Kang et al. | 455/458 |
| 2011/0134893 A1 | 6/2011 | Park et al. | |
| 2011/0312347 A1 * | 12/2011 | Dinan | 455/458 |

FOREIGN PATENT DOCUMENTS

| | | |
|---|---|---|
| KR | 10-2009-0127048 | 12/2009 |
| KR | 10-2009-0129289 | 12/2009 |
| KR | 10-2009-0129587 | 12/2009 |
| KR | 10-2010-0024332 | 3/2010 |
| KR | 10-2010-0069537 | 6/2010 |
| WO | 2009/151269 A2 | 12/2009 |

\* cited by examiner

*Primary Examiner* — Dominic E Rego
(74) *Attorney, Agent, or Firm* — Staas & Halsey LLP (57) ABSTRACT

A base station adds a paging message indicator representing a position of a frame to receive a paging advertisement message and a paging subgroup indicator representing a paging subgroup to which the paging advertisement message is to be transmitted to a PGID-INFO message and transmits the PGID-INFO message to a terminal, and the terminal determines whether a paging advertising message is to be transmitted using a paging message indicator and a paging subgroup indicator of the PGID-INFO message and a position of a frame to receive a paging advertisement message.

20 Claims, 10 Drawing Sheets

| | Paging message pointer (bitmap) | | | |
|---|---|---|---|---|
| | 1th | 2th | ... | mth |
| 1th | 1 | 2 | ... | m |
| 2th | m+1 | M+2 | ... | 2m |
| ⋮ | ⋮ | ⋮ | ⋮ | ⋮ |
| pth | p*m+1 | p*m+2 | ... | p*m+m |
| 1th | (p+1)*m+1 | (p+1)*m+2 | ... | (p+1)*m+m |
| 2th | (p+2)*m+1 | (p+2)*m+2 | ... | (p+2)*m+m |
| ⋮ | ⋮ | ⋮ | ⋮ | ⋮ |

(Paging subgroup pointer (bitmap))

Paging subgroup 1
Paging subgroup 2
Paging subgroup p

APPARATUS AND METHOD FOR PAGING IN WIRELESS COMMUNICATION SYSTEM

CROSS-REFERENCE TO RELATED APPLICATION

This application claims priority to and the benefit of Korean Patent Application No. 10-2010-0131852 filed in the Korean Intellectual Property Office on Dec. 21, 2010, the entire contents of which are incorporated herein by reference.

BACKGROUND OF THE INVENTION (a) Field of the Invention

The present invention relates to an apparatus and method for paging in a wireless communication system.

(b) Description of the Related Art

In a wideband wireless communication system, when traffic to transmit/receive does not exist for a predetermined time period, a terminal operates in an idle mode, thereby minimizing power consumption. That is, when traffic to transmit/receive does not exist for a predetermined time period, a terminal performs a service deregistration operation with a serving base station that presently performs communication and enters an idle mode.

In an idle mode, paging is performed in a unit of a paging group. The terminal may belong to at least one paging group.

When a packet to transmit to the terminal in an idle mode occurs, the base station transmits a paging information message in which paging group identifier information is included to the terminal within a paging group, and then transmits a paging advertisement message at a predesignated frame on a paging group basis.

The terminal receives a paging group identifier, a paging cycle, and paging offset information from a serving base station in a service deregistration operation and performs paging.

At a start point of one paging cycle, a paging listening interval starts after paging offset, and at the paging listening interval, the terminal receives a paging information message in which paging group identifier information is included. The terminal determines whether a paging group identifier that receives allocation from the base station corresponds with paging group identifier information that is included in a paging information message, and if a paging group identifier that receives allocation from the base station corresponds with paging group identifier information that is included in a paging information message, the terminal calculates a position of a frame to transmit a paging advertisement message in which the terminal should receive and receives the paging advertisement message that is transmitted at the frame.

The terminal receives the paging advertisement message and determines whether paging to transmit thereto exists, and if paging to transmit thereto exists, the terminal enters a normal mode and performs communication with the base station.

In this way, only when the terminal receives a page information message and then receives a paging advertisement message can the terminal know whether paging of the terminal exists and thus power consumption of the terminal increases.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide an apparatus and method for paging in a wireless communication system having advantages of reducing power consumption of a terminal.

An exemplary embodiment of the present invention provides a method in which a base station performs paging of a terminal that enters an idle mode. The method includes: setting a paging message indicator representing a position of a frame to transmit a paging advertisement message and a paging subgroup indicator representing a paging subgroup to which the paging advertisement message is to be transmitted; adding the paging message indicator and the paging subgroup indicator to a paging information (PGID-INFO) message and transmitting the PGID-INFO message to each terminal; and transmitting the paging advertising message at a position of a corresponding frame.

Another embodiment of the present invention provides a method of paging in a terminal. The method includes: entering an idle mode; receiving a PGID-INFO message including PGID-INFO from a base station; determining a position of a frame to receive a paging advertisement message and whether the terminal belongs to a paging subgroup to which the paging advertisement message is to be transmitted using the PGID-INFO; and receiving, if the terminal belongs to the paging subgroup to which the paging advertisement message is to be transmitted, the paging advertisement message at the position of a frame to receive the paging advertisement message.

Yet another embodiment of the present invention provides a paging apparatus of a base station. The paging apparatus includes an idle operation controller and a paging control unit. The idle operation controller transmits PGID-INFO including a deregistration identifier (DID) and a paging group identifier of a terminal entering an idle mode to a terminal. The paging control unit forms a paging message indicator representing a position of a frame to transmit a paging advertising message using a DID of a terminal belonging to the paging group identifier, adds the paging message indicator to a PGID-INFO message, transmits the PGID-INFO message to the terminal, and transmits the paging advertising message at the position of a frame to transmit the paging advertising message.

Yet another embodiment of the present invention provides a paging apparatus of a terminal. The paging apparatus includes a paging reception determining unit and a paging determining unit. The paging reception determining unit receives a PGID-INFO message including a paging message indicator and a paging subgroup indicator from a base station, and determines a position of a frame to receive a paging advertisement message and whether the terminal belongs to a paging subgroup to which a paging advertisement message is to be transmitted among a plurality of paging subgroups. The paging determining unit receives the paging advertisement message if the terminal belongs to the paging subgroup to which the paging advertisement message is to be transmitted at a position of a corresponding frame, and that determines whether paging of the terminal exists.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, in the specification and claims, unless explicitly described to the contrary, the word "comprise" and variations such as "comprises" or "comprising" will be understood to imply the inclusion of stated elements but not the exclusion of any other elements.

In this specification, a terminal may indicate a mobile station (MS), a mobile terminal (MT), a subscriber station (SS), a portable subscriber station (PSS), user equipment (UE), and an access terminal (AT), and may include an entire function or a partial function of the MT, the SS, the PSS, the UE, and the AT.

In this specification, a base station (BS) may indicate an access point (AP), a radio access station (RAS), a node B, an evolved node B (eNode B), a base transceiver station (BTS), and a mobile multihop relay (MMR)-BS, and may include an entire function or a partial function of the AP, the RAS, the node B, the eNode B, the BTS, and the MMR-BS.

Hereinafter, an apparatus and method for paging in a wireless communication system according to an exemplary embodiment of the present invention will be described in detail with reference to the drawings.

Figure 1:
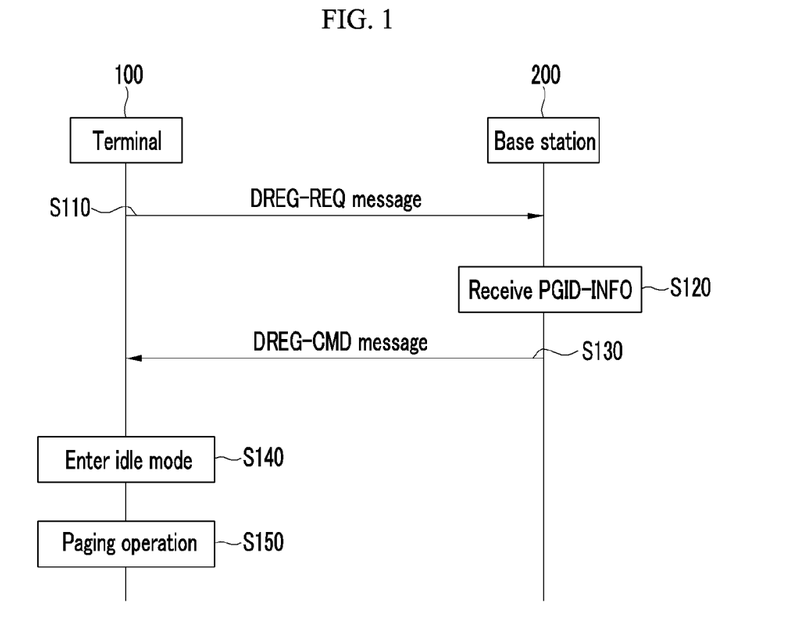
FIG. 1 is a flowchart illustrating an example of a paging method in a wireless communication system.
Figure 2:
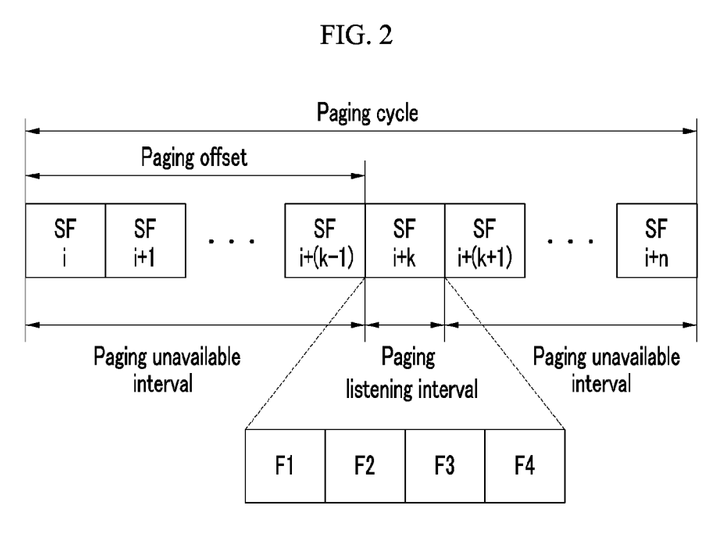
FIG. 2 is a diagram illustrating a paging cycle.

FIG. 1 is a flowchart illustrating an example of a paging method in a wireless communication system, and FIG. 2 is a diagram illustrating a paging cycle.

Referring to FIG. 1, when traffic to transmit/receive for a predetermined period does not exist, in order to reduce power consumption, a terminal 100 operates in an idle mode.

In order to change from a normal mode to an idle mode, the terminal 100 transmits a deregistration request (DREG-REQ) message to a base station 200 (S110). The base station 200 transmits the DREG-REQ message from the terminal 100 to a paging controller (not shown).

The base station 200 receives paging information regarding the terminal 100 having transmitted the DREG-REQ message from the paging controller (S120). The paging information may include a paging group identifier (PGID), a paging cycle, paging offset, and a deregistration identifier (DID). The PGID is an identifier that is provided to a paging area that is formed with at least one cell, and a plurality of terminals may belong to a paging group. The DID is an ID that identifies the terminal 100 from the PGID to which the terminal 100 belongs.

The base station 200 transmits a deregistration command (DREG-CMD) message including paging information to the terminal 100 in response to the DREG-REQ message (S130). The terminal 100 enters an idle mode after determining the DREG-CMD message (S140) and performs a paging operation with reference to paging information in an idle mode (S150).

As shown in FIG. 2, an idle mode has a paging cycle, and the terminal 100 performs a paging operation in the paging cycle.

One paging cycle includes a paging listening interval and a paging unavailable interval.

At the paging unavailable interval, the terminal 100 operates in a power saving mode, thereby minimizing power consumption.

The paging listening interval starts after paging offset from a start point of the paging cycle, and the length of the paging listening interval may be equal to the length of one super frame (SF). One SF may include a plurality of frames, for example, four frames F1-F4.

Upon arriving at a paging listening interval, the terminal 100 terminates the power saving mode, acquires downlink synchronization, then receives a paging advertisement message from the base station 200 and determines whether paging of the terminal 100 exists.

Figure 3:
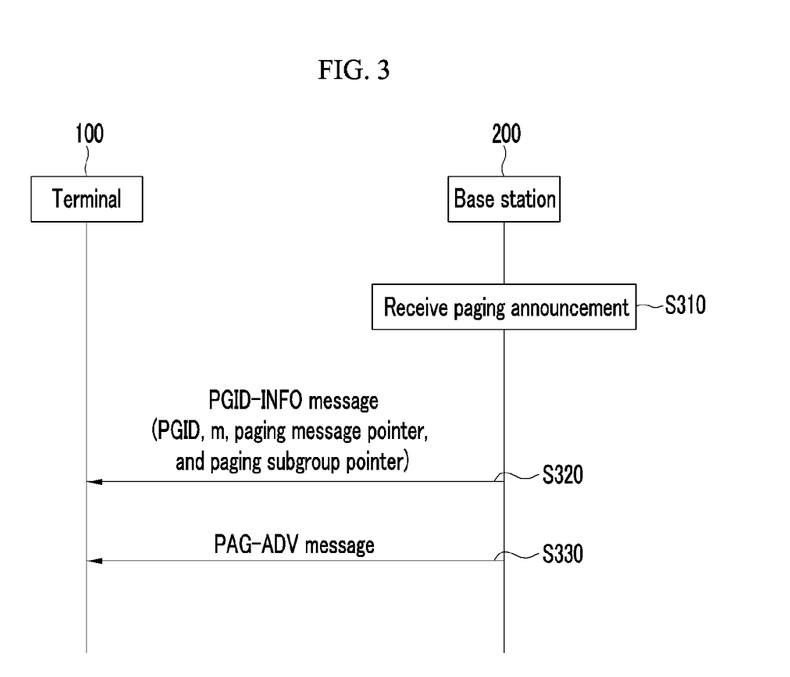
FIG. 3 is a flowchart illustrating a paging method in a base station according to an exemplary embodiment of the present invention.

FIG. 3 is a flowchart illustrating a paging method in a base station according to an exemplary embodiment of the present invention.

Referring to FIG. 3, the base station 200 receives a paging announcement from the paging controller (S310). When a call or an external packet (hereinafter, referred to as an "incoming call service") occurs, the paging controller transmits a paging announcement to the base station 200, and the paging announcement may include paging information, i.e., a PGID, a paging cycle, paging offset, and a DID.

The base station 200, having received the paging announcement from the paging controller, transmits a paging information (PGID-INFO) message including PGID-INFO to the terminal 100 (S320).

In general, the PGID-INFO message includes a PGID and a frame parameter value m representing the frame number of an SF for paging.

In order to reduce power consumption of the terminal 100, the base station 200 according to an exemplary embodiment of the present invention sets a paging message indicator and a paging subgroup indicator using a DID and adds a paging message indicator and a paging subgroup indicator to the PGID-INFO message.

The paging message indicator and the paging subgroup indicator may be set with a bitmap. Information of the paging message indicator represents whether a paging advertisement (PAG-ADV) message is transmitted/received at a random frame, and information of the paging subgroup indicator represents whether the PAG-ADV message is transmitted/received to a random paging subgroup.

In the paging message indicator, a bit value "1" represents that a PAG-ADV message is transmitted in a corresponding frame, and a bit value "0" represents that a PAG-ADV message is not transmitted in a corresponding frame.

Further, in the paging subgroup indicator, a bit value "1" represents that a PAG-ADV message is transmitted to a corresponding paging subgroup, and a bit value "0" represents that a PAG-ADV message is not transmitted to a corresponding paging subgroup.

That is, the PGID-INFO message may be formed as shown in Table 1.

TABLE 1

| Attributes | Size (bits) | Value/Note |
| --- | --- | --- |
| Num_PGIDs | 2 | Number of paging groups (PGID) |
| PGID | 16 | Paging group identifier |
| m | 2 | Number of frames of a super frame used for paging |
| Paging message indicator bitmap | m | 0: PAG-ADV message is not transmitted at i-th frame<br>1: PAG-ADV message is transmitted at i-th frame |
| Paging subgroup indicator bitmap | p | 0: PAG-ADV message is not transmitted to corresponding paging subgroup<br>1: PAG-ADV message is transmitted to corresponding paging subgroup |

As shown in Table 1, the PGID-INFO message may include the number of paging groups Num_PGIDs, a PGID, a frame parameter value m, a paging message indicator, and a paging subgroup indicator.

The base station 200 transmits a PGID-INFO message to the terminal 100 at a first frame (F1 of FIG. 2) in which a paging listening interval starts.

Thereafter, according to a paging message indicator, when a bit value is 1, the base station 200 transmits a PAG-ADV message at a corresponding frame (S330), and when a bit value is 0, the base station 200 does not transmit a PAG-ADV message at a corresponding frame.

Next, a method of setting a paging message indicator and a paging subgroup indicator in the base station 200 will be described in detail with reference to FIGS. 4 to 7.

Figure 4:
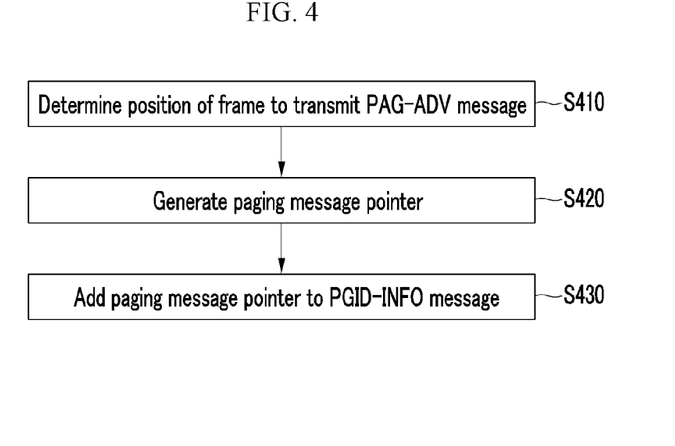
FIG. 4 is a flowchart illustrating a method of setting a paging message indicator in a base station according to an exemplary embodiment of the present invention.
Figure 5:
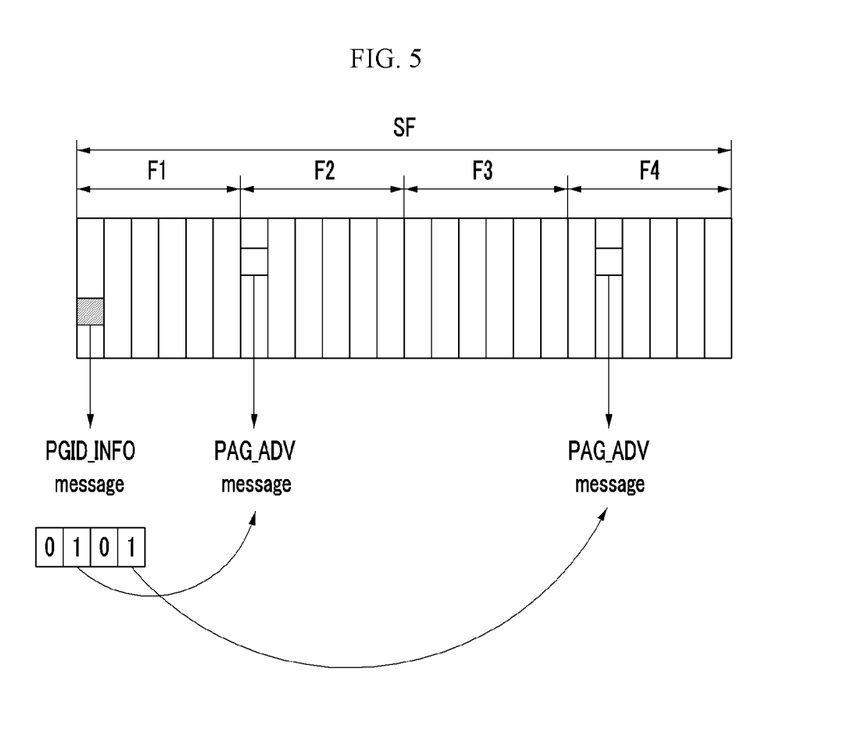
FIG. 5 is a diagram illustrating an example of a paging message indicator.

FIG. 4 is a flowchart illustrating a method of setting a paging message indicator in a base station according to an exemplary embodiment of the present invention, and FIG. 5 is a diagram illustrating an example of a paging message indicator.

Referring to FIG. 4, the base station 200 determines a position of a frame to transmit a PAG-ADV message using a DID of the terminal 100 (S410). A position of a frame to transmit a PAG-ADV message is determined by Equation 1.

$$j = DID \% m \quad \text{[Equation 1]}$$

where j represents a j-th frame to transmit a PAG-ADV message, and m represents a frame parameter value. Further, % indicates a modular operation.

That is, the base station 200 divides a DID of the terminal 100 by a frame parameter value (m) and determines a frame corresponding to the remaining value as a frame to transmit a PAG-ADV message.

Thereafter, the base station 200 sets a bit value to 1 to correspond to a position of the determined frame and sets a bit value to 0 to correspond to a position of the remaining frames, thereby generating a paging message indicator (S420).

The base station 200 adds the paging message indicator to a corresponding field of a PGID-INFO message and transmits the PGID-INFO message to the terminal 100 (S430).

For example, as shown in FIG. 5, when one SF includes four frames F1-F4, if a frame parameter value is 4, the paging message indicator is formed with 4 bits, and bits correspond to four frames F1-F4, respectively. When the frames F1 and F3 are determined as frames to transmit the PAG-ADV message, the base station 200 sets the paging message indicator to 0101. In this case, "0101" sequentially corresponds to the frames F0-F3, respectively. Thereafter, the base station 200 adds the paging message indicator of 0101 to the PGID-INFO message.

Thereafter, the base station 200 transmits the PAG-ADV message to the terminal 100 at the frames F1 and F3.

In this way, when the base station 200 determines a position of a frame to transmit a PAG-ADV message using a DID of a terminal belonging to one PGID and sets a paging message indicator, terminals of one PGID are divided into groups according to a position of a frame to receive the PAG-ADV message.

Therefore, terminals having a random PGID determine a paging message indicator of the PGID-INFO message and receive the PAG-ADV message at a frame position corresponding to a bit value "1". That is, at a frame position corresponding to a bit value "0" of the paging message indicator, terminals enter a power saving mode, thereby reducing power consumption.

Figure 6:
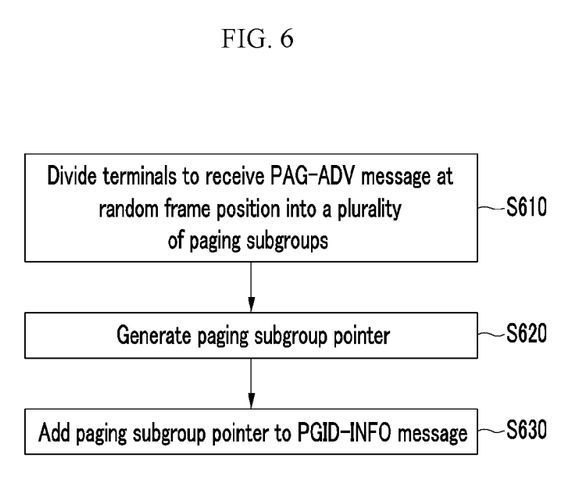
FIG. 6 is a flowchart illustrating a method of setting a paging subgroup indicator in a base station according to an exemplary embodiment of the present invention.
Figure 7:
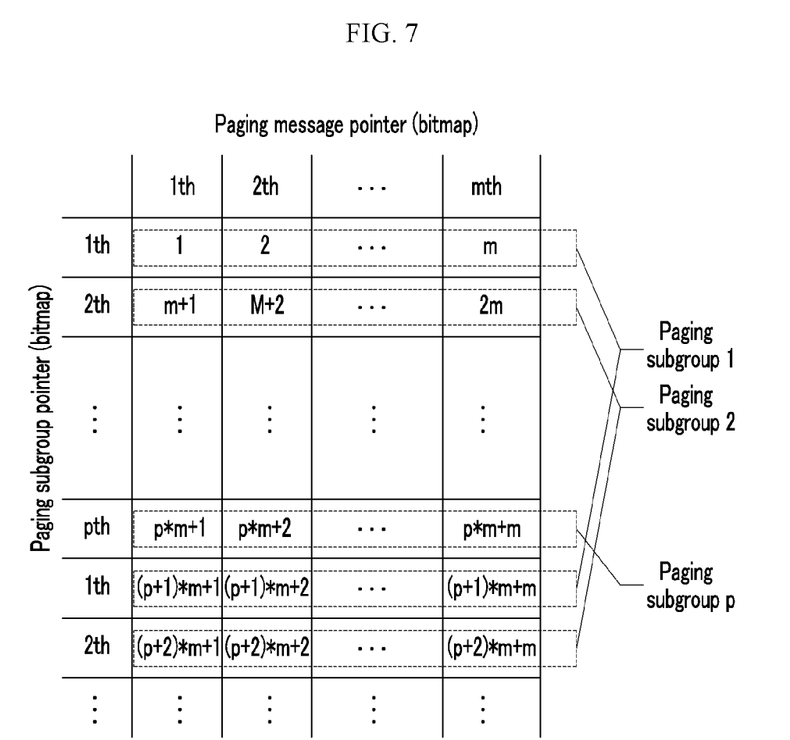
FIG. 7 is a diagram illustrating a method of forming a paging subgroup in a base station according to an exemplary embodiment of the present invention.

FIG. 6 is a flowchart illustrating a method of setting a paging subgroup indicator in a base station according to an exemplary embodiment of the present invention, and FIG. 7 is a diagram illustrating a method of forming a paging subgroup in a base station according to an exemplary embodiment of the present invention.

Referring to FIG. 6, the base station 200 divides terminals of a terminal group to receive a PAG-ADV message into a plurality of paging subgroups at a random frame position (S610). The base station 200 divides the terminals into a plurality of paging subgroups using a DID of each terminal of a corresponding terminal group.

The base station 200 sets a bit value to 1 to correspond to a subgroup to which the PAG-ADV message is to be transmitted and sets a bit value to 0 to correspond to the remaining subgroups, thereby generating a paging subgroup indicator (S620).

The base station 200 adds a paging subgroup indicator to a corresponding field of the PGID-INFO message and transmits the PGID-INFO message to the terminal 100 (S630).

That is, the base station 200 allocates terminals of a terminal group to receive the PAG-ADV message at a random frame position to a plurality of paging subgroups by a method of Equation 2.

$$i = k \% p \quad \text{[Equation 2]}$$

where i represents the i-th paging subgroup, p is the bit number of a paging subgroup indicator, and k is obtained by Equation 3.

$$k = DID/m \quad \text{[Equation 3]}$$

where m represents the bit number of the paging message indicator, i.e., a frame parameter value.

For example, if the bit number of the paging message indicator is m and the bit number of the paging subgroup indicator is p, terminals of a terminal group to receive the PAG-ADV message at a random frame position may be allocated to each paging subgroup as shown in FIG. 7.

Further, if the bit number of the paging subgroup indicator is 4, when a PAG-ADV message is transmitted to 1st and 3rd paging subgroups of paging subgroups corresponding to each bit, the base station 200 may set the paging subgroup indicator to "1010".

Resultantly, at a random frame position, terminals of a terminal group to receive the PAG-ADV message are divided again into a paging subgroup.

In this way, the base station 200 divides terminals belonging to a paging group identifier into different groups according to a frame position, again divides terminals of a terminal group to receive the PAG-ADV message at a random frame position into a paging subgroup, and then represents whether a PAG-ADV message is to be transmitted to each paging subgroup, thereby maximizing a power saving mode effect of terminals belonging to a paging group identifier.

Figure 8:
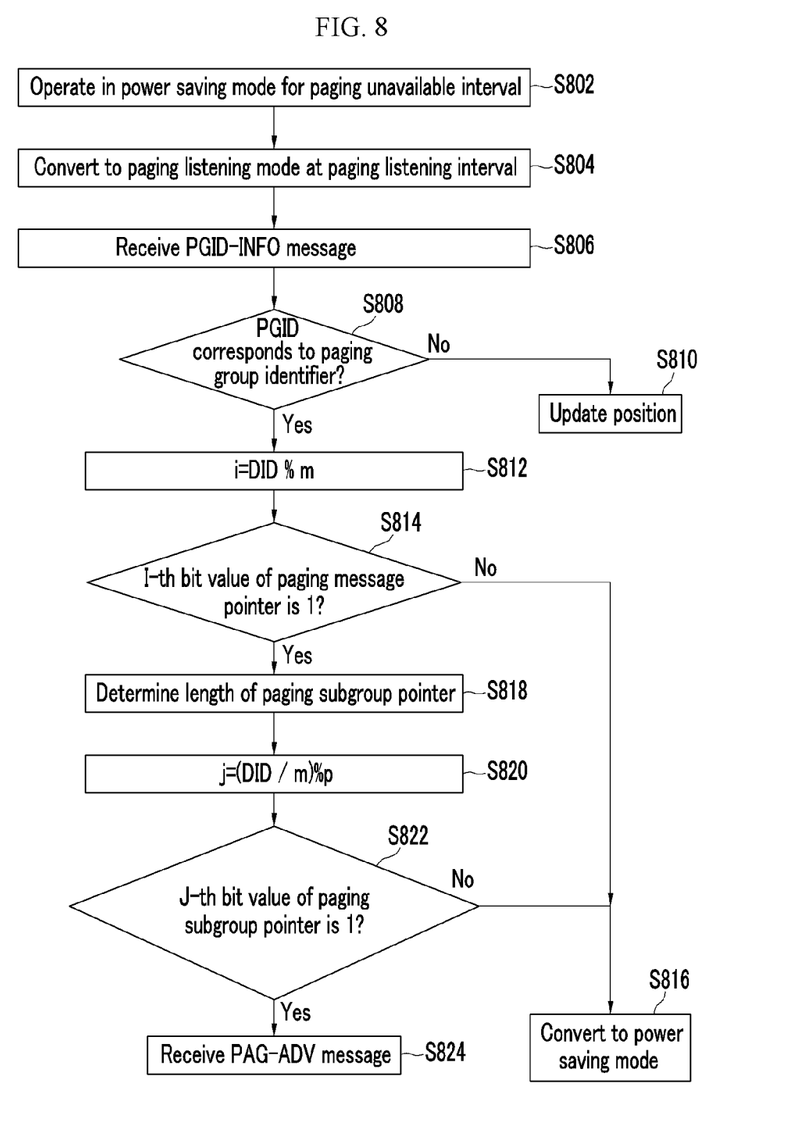
FIG. 8 is a flowchart illustrating a paging method in a terminal according to an exemplary embodiment of the present invention.

FIG. 8 is a flowchart illustrating a paging method in a terminal according to an exemplary embodiment of the present invention.

Referring to FIG. 8, the terminal 100 operates in a power saving mode for a paging unavailable interval (S802).

Upon arriving at a paging listening interval, the terminal 100 terminates a power saving mode and is converted to a paging listening mode (S804).

In the paging listening mode, the terminal 100 acquires downlink synchronization and then receives a PGID-INFO message at a first frame of a paging listening interval (S806).

The terminal 100 determines whether the PGID that is included in a PGID-INFO message corresponds with a paging group identifier that is allocated from the base station 200 (S808). As described above, upon entering an idle mode, the terminal 100 receives a paging group identifier through a DREG-CMD message that is received from the base station 200.

If the PGID that is included in a PGID-INFO message does not correspond with a paging group identifier that is allocated from the base station 200, the terminal 100 updates a position (S810).

If the PGID that is included in a PGID-INFO message corresponds with a paging group identifier that is allocated from the base station 200, in order to determine reception of the PAG-ADV message and a position of a frame to receive the PAG-ADV message, the terminal 100 determines a remaining value in which a DID thereof is divided by m (S812). When the remaining value is i, the terminal 100 determines whether an i-th bit value of the paging message indicator is 0 or 1 (S814).

If an i-th bit value of the paging message indicator is 0, the terminal 100 determines that a PAG-ADV message to be transmitted to the terminal 100 does not exist and is converted to a power saving mode (S816).

If an i-th bit value of the paging message indicator is 1, the terminal 100 performs a procedure for determining whether a PAG-ADV message to be transmitted at an i-th frame is a message for a paging subgroup to which the terminal 100 belongs.

For this reason, the terminal 100 determines a length of a paging subgroup indicator, i.e., the number of paging subgroups in the PAG-INFO message (S818). The length of a paging subgroup indicator can be seen through a PGID-INFO message.

In this case, when the length of a paging subgroup indicator is p, the terminal 100 obtains the remaining value in which a value in which a DID is divided by m is divided by p, as represented by Equations 2 and 3 (S820).

When the remaining value that is obtained at step S820 is j, the terminal 100 determines whether a j-th bit value of a paging subgroup indicator is 0 or 1 (S822). If a j-th bit value of a paging subgroup indicator is 1, the terminal 100 receives the PAG-ADV message at the i-th frame and determines whether paging of the terminal 100 exists (S824). If a DID of the terminal 100 exists in the PAG-ADV message, the terminal 100 determines that paging of the terminal 100 exists.

If a j-th bit value of a paging subgroup indicator is 0, the terminal 100 is immediately converted to a power saving mode (S816).

In a conventional paging method, at a paging listening interval, all terminals having a paging group identifier receive a PGID-INFO message and then a PAG-ADV message, thereby determining whether paging of the terminal 100 exists. Therefore, when the number of terminals belonging to a paging group identifier increases, even if paging to transmit to the terminal does not exist, the terminal should receive a PAG-ADV message at a paging listening interval.

However, according to an exemplary embodiment of the present invention, all terminals having a paging group identifier determine whether the terminal belongs to a subgroup to receive a PAG-ADV message without the necessity of receiving a PAG-ADV message, and if the terminal belongs to a subgroup to receive a PAG-ADV message, the terminal receives the PAG-ADV message, thereby maximizing a power saving effect.

Figure 9:
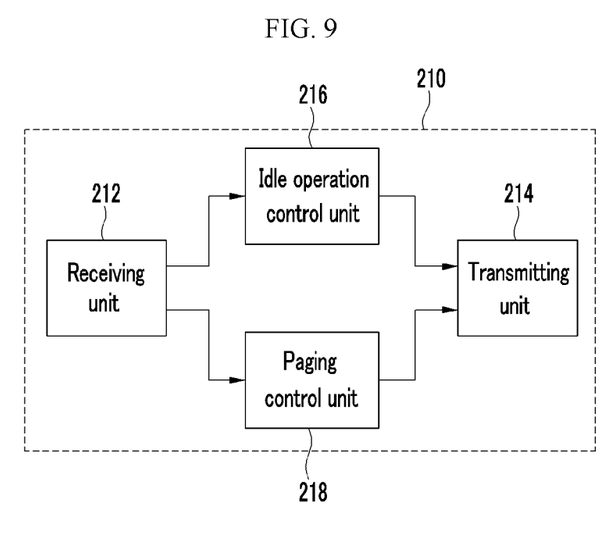
FIG. 9 is a block diagram illustrating a paging apparatus of a base station according to an exemplary embodiment of the present invention.

FIG. 9 is a block diagram illustrating a paging apparatus of a base station according to an exemplary embodiment of the present invention.

Referring to FIG. 9, a paging apparatus 210 of the base station 200 includes a receiving unit 212, a transmitting unit 214, an idle operation control unit 216, and a paging control unit 218.

The receiving unit 212 receives PGID-INFO from a paging controller, and transfers the PGID-INFO to the idle operation control unit 216 and the paging control unit 218. Further, the receiving unit 212 receives a DREG-REQ message from the terminal 100 and transfers the DREG-REQ message to the idle operation control unit 216.

The transmitting unit 214 transmits a DREG-CMD message, a PGID-INFO message, and a PAG-ADV message to the terminal 100 according to the control of the idle operation control unit 216 and the paging control unit 218.

The idle operation control unit 216 includes PGID-INFO in the DREG-CMD message in response to the DREG-REQ message from the terminal 100, and transfers the DREG-CMD message to the transmitting unit 214.

The paging control unit 218 determines a position of a frame to transmit a PAG-ADV message using a DID of each terminal with respect to terminals having a random PGID, and generates a paging message indicator using the determined frame position.

The paging control unit 218 divides terminals to receive a PAG-ADV message at a random frame position among terminals having a random PGID into paging subgroups using a DID of each terminal, and generates a paging subgroup indicator through a subgroup to which a PAG-ADV message is to be transmitted.

The paging control unit 218 adds PGID-INFO such as a paging message indicator, a paging subgroup indicator, a paging group identifier, and a frame parameter value to a corresponding field of a PGID-INFO message, and transfers the PGID-INFO message to the transmitting unit 214.

Further, in order to transmit a PAG-ADV message to the terminal 100 at a corresponding frame according to the paging message indicator, the paging control unit 218 transmits a PAG-ADV message to the transmitting unit 214 at a corresponding frame.

Figure 10:
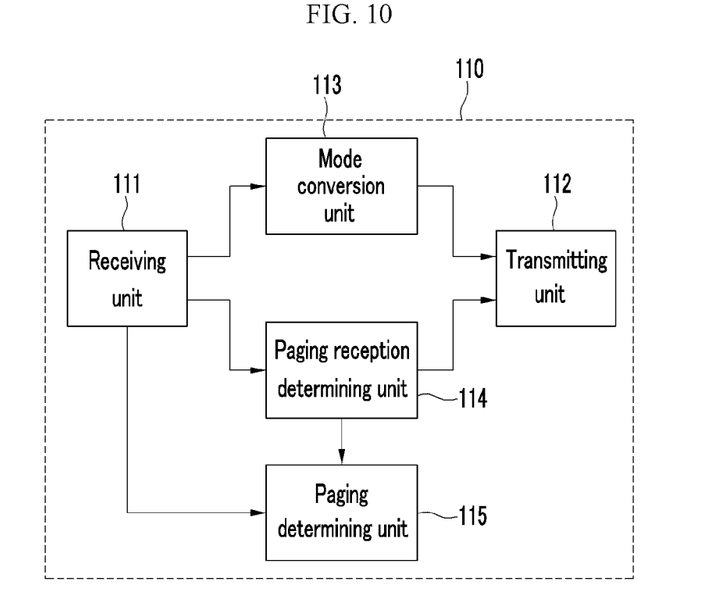
FIG. 10 is a block diagram illustrating a paging apparatus of a terminal according to an exemplary embodiment of the present invention.

FIG. 10 is a block diagram illustrating a paging apparatus of a terminal according to an exemplary embodiment of the present invention.

Referring to FIG. 10, a paging apparatus 110 of the terminal 100 includes a receiving unit 111, a transmitting unit 112, a mode conversion unit 113, a paging reception determining unit 114, and a paging determining unit 115.

In order to allow the terminal 100 to enter an idle mode, the transmitting unit 112 transmits a DREG-REQ message to the base station 200.

The receiving unit 111 receives a DREG-CMD message from the base station 200 and transfers the DREG-CMD message to the mode conversion unit 113. Further, the receiving unit 111 receives a PGID-INFO message from the base station 200, transfers the PGID-INFO message to the paging reception determining unit 114, receives a PAG-ADV message at a determined frame position, and transfers the PAG-ADV message to the paging determining unit 115.

When the mode conversion unit 113 receives a DREG-CMD message from the base station 200, the mode conversion unit 113 converts the mode of the terminal 100 to an idle mode and allows the terminal 100 to operate in an idle mode. The mode conversion unit 113 allows the terminal 100 to operate in a power saving mode for a paging unavailable interval in an idle mode, and when the terminal 100 arrives at a paging listening interval, the mode conversion unit 113 converts the mode of the terminal 100 to a paging listening mode and allows the terminal 100 to operate in the paging listening mode.

The paging reception determining unit 114 determines whether a PAG-ADV message is received and a position of a frame to receive a PAG-ADV message using PGID-INFO of a PGID-INFO message that receives at a first frame of a paging listening interval. Thereafter, if a PAG-ADV message to transmit to the terminal 100 at a corresponding frame does not exist, the paging reception determining unit 114 notifies the mode conversion unit 113 of this. Accordingly, the mode conversion unit 113 immediately converts the mode of the terminal 100 to a power saving mode.

Further, if a PAG-ADV message to transmit to the terminal 100 at a corresponding frame exists, the paging reception determining unit 114 determines whether the terminal 100 belongs to a subgroup to which a PAG-ADV message is to be transmitted using the above-described method. Thereafter, if the terminal 100 belongs to a subgroup to which a PAG-ADV message is to be transmitted, the paging reception determining unit 114 notifies the paging determining unit 115 of this, and if the terminal 100 does not belong to a subgroup to which a PAG-ADV message is to be transmitted, the paging reception determining unit 114 notifies the mode conversion unit 113 of this and allows the mode conversion unit 113 to convert the mode of the terminal 100 to a power saving mode.

The paging determining unit 115 receives a PAG-ADV message at the determined frame position and determines that paging of the terminal 100 exists if a DID of the terminal 100 exists. Thereafter, the paging determining unit 115 notifies the mode conversion unit 113 of this and allows performing of an operation for receiving an incoming call service.

According to an exemplary embodiment of the present invention, a base station divides terminals belonging to a random paging group into different groups according to a position of a frame to receive a paging advertisement message using a DID of each terminal, and again divides a group to receive a paging message into paging subgroups at a random frame position, and transmits a result of whether a paging advertisement message is to be transmitted to each subgroup to the terminal. The terminal determines reception of a paging advertisement message by determining whether the terminal belongs to a subgroup to which the paging advertisement message is to be transmitted, thereby maximizing a power saving mode effect of the terminal.

An exemplary embodiment of the present invention may not only be embodied through the above-described apparatus and/or method, but may also embodied through a program that executes a function corresponding to a configuration of the exemplary embodiment of the present invention or through a recording medium on which the program is recorded, and can be easily embodied by a person of ordinary skill in the art from the description of the foregoing exemplary embodiment.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method in which a base station performs paging of a terminal that enters an idle mode, the method comprising:
    setting a paging message indicator representing a position of a frame to transmit a paging advertisement message and a paging subgroup indicator representing a paging subgroup to which the paging advertisement message is to be transmitted;
    adding the paging message indicator and the paging subgroup indicator to a paging information (PGID-INFO) message and transmitting the PGID-INFO message to each terminal; and
    transmitting the paging advertising message at a position of a corresponding frame.

2. The method of claim 1, further comprising receiving a paging group identifier and a deregistration identifier (DID) of each terminal before the setting of a paging message indicator,
    wherein the PGID-INFO message comprises the paging group identifier and the DID.

3. The method of claim 2; wherein the setting of a paging message indicator comprises:
    determining the position of the frame to transmit the paging advertisement message using a DID of each terminal having the paging group identifier; and
    forming the paging message indicator by setting a bit value corresponding to the position of the frame to transmit the paging advertisement message to 1,
    wherein bits of the paging message indicator correspond to a plurality of frames, respectively, that are used for paging.

4. The method of claim 3, wherein the transmitting of the paging advertising message comprises transmitting the paging advertisement message at a frame corresponding to the bit value 1.

5. The method of claim 3, wherein the determining of a position of a frame comprises determining a frame corresponding to a value that performs a modular operation of a DID of the terminal with a frame parameter value representing the number of the plurality of frames as the frame to transmit the paging advertisement message.

6. The method of claim 3, wherein the setting of a paging message indicator comprises:

dividing terminals to receive a paging advertisement message at one frame position into a plurality of paging subgroups;

determining a paging subgroup to which a terminal to receive the paging advertisement message belongs; and forming the paging subgroup indicator by setting a bit value corresponding to a paging subgroup to which a terminal to receive the paging advertisement message belongs to 1 and setting a bit value corresponding to a paging subgroup to which a terminal to receive the paging advertisement message does not belong to 0, wherein bits of the paging message indicator correspond to the plurality of subgroups, respectively.

7. The method of claim 6, wherein the dividing of terminals comprises:

obtaining a quotient by dividing a DID of each terminal to receive a paging advertisement message at one frame position by a frame parameter value representing the number of the plurality of frames;

performing a modular operation of the quotient with the number of the plurality of paging subgroups; and comprising each terminal to receive the paging advertisement message at the one frame position in a paging subgroup corresponding to a value of the modular operation.

8. A method of paging in a terminal, the method comprising:

entering an idle mode;

receiving a PGID-INFO (paging information) message comprising PGID-INFO from a base station;

determining a position of a frame to receive a paging advertisement message via a paging message indicator representing the position of the frame and whether the terminal belongs to a paging subgroup to which the paging advertisement message is to be transmitted via a paging subgroup indicator representing the paging subgroup using the PGID-INFO; and receiving, if the terminal belongs to the paging subgroup to which the paging advertisement message is to be transmitted, the paging advertisement message at the position of a frame to receive the paging advertisement message.

9. The method of claim 8, wherein the PGID-INFO comprises a paging message indicator representing a position of a frame to receive a paging advertisement message and a paging subgroup indicator representing a paging subgroup to which the paging advertisement message is to be transmitted at one frame position.

10. The method of claim 9, wherein the PGID-INFO further comprises a DID (deregistration identifier), and the determining of a position comprises:

calculating a position of a frame in which the terminal should receive a paging advertising message using a DID thereof; and entering a power saving mode if a value of a bit corresponding to the position of the frame in which the terminal should receive the paging advertising message is 0 in the paging message indicator.

11. The method of claim 10, wherein the determining of a position further comprises:

determining, if a value of the bit corresponding to the position of the frame in which the terminal should receive the paging advertisement message is 1 in the paging message indicator, a value of a bit corresponding to a paging subgroup to which the terminal belongs in the paging subgroup indicator; and entering a power saving mode if the value of the bit corresponding to the paging subgroup to which the terminal belongs is 0.

12. The method of claim 11, wherein the determining of a position further comprises determining, if the value of the bit corresponding to the paging subgroup to which the terminal belongs is 1, that the terminal belongs to the paging subgroup to which the paging advertisement message is to be transmitted.

13. The method of claim 11, wherein the determining of a value comprises:

obtaining a quotient by dividing a DID of the terminal by the number of frames that is used for paging;

performing a modular operation of the quotient with the number of a plurality of paging subgroups; and determining a paging subgroup corresponding to a value by a modular operation as a subgroup to which the terminal belongs.

14. The method of claim 8, further comprising receiving the paging advertisement message and determining whether paging of the terminal exists.

15. A paging apparatus of a base station, the paging apparatus comprising:

an idle operation control unit that transmits PGID-INFO (paging information) comprising a DID (deregistration identifier) and a paging group identifier of a terminal entering an idle mode to a terminal; and a paging control unit that forms a paging message indicator representing a position of a frame to transmit a paging advertising message using a DID of a terminal belonging to the paging group identifier, that adds the paging message indicator to a PGID-INFO message, that transmits the PGID-INFO message to the terminal, and that transmits the paging advertising message at the position of a frame to transmit the paging advertising message.

16. The paging apparatus of claim 15, wherein the paging control unit forms a paging subgroup indicator representing a paging subgroup to which the paging advertisement message is to be transmitted at a position of each frame to transmit the paging advertising message, adds the paging subgroup indicator to the PGID-INFO message, and transmits the PGID-INFO message to the terminal.

17. A paging apparatus of a terminal, the paging apparatus comprising:

a paging reception determining unit that receives a PGID-INFO message comprising a paging message indicator and a paging subgroup indicator from a base station, and that determines a position of a frame to receive a paging advertisement message and whether the terminal belongs to a paging subgroup to which a paging advertisement message is to be transmitted among a plurality of paging subgroups; and a paging determining unit that receives the paging advertisement message if the terminal belongs to the paging subgroup to which the paging advertisement message is to be transmitted at a position of a corresponding frame, and that determines whether paging of the terminal exists.

18. The paging apparatus of claim 17, further comprising a mode conversion unit that converts a mode of the terminal to a power saving mode if the paging advertisement message to transmit to the terminal does not exist at the position of the corresponding frame.

19. The paging apparatus of claim 17, further comprising a mode conversion unit that converts a mode of the terminal to a power saving mode if the terminal does not belong to the paging subgroup to which the paging advertisement message is to be transmitted at the position of the corresponding frame.

20. The paging apparatus of claim 17, wherein the paging message indicator and the paging subgroup indicator are formed with bitmaps, bits of the paging message indicator correspond to a plurality of frames, respectively, that are used for paging, and bits of the paging message indicator correspond to the plurality of subgroups, respectively.

* * * * *